Feb. 25, 1941.  A. RONNING  2,232,972
VEHICLE SUPPORTING TRUCK
Filed Dec. 28, 1939
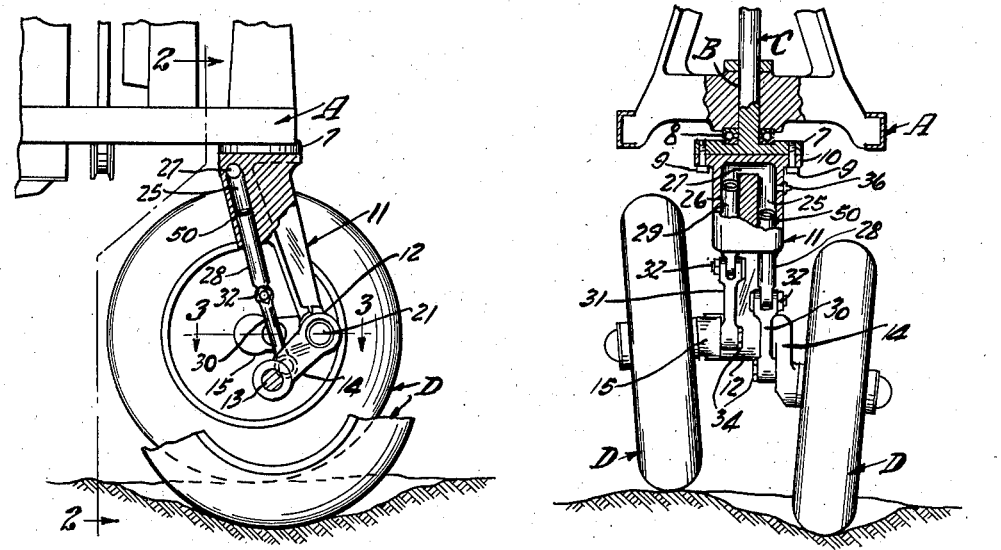
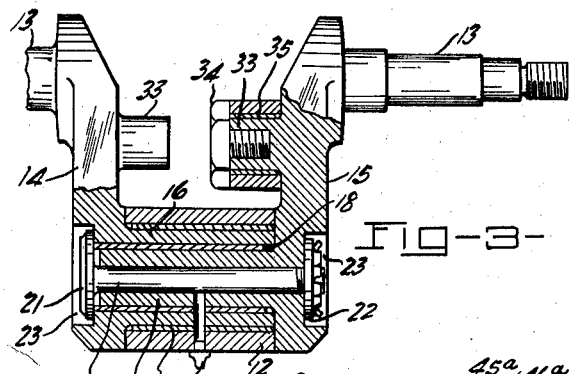
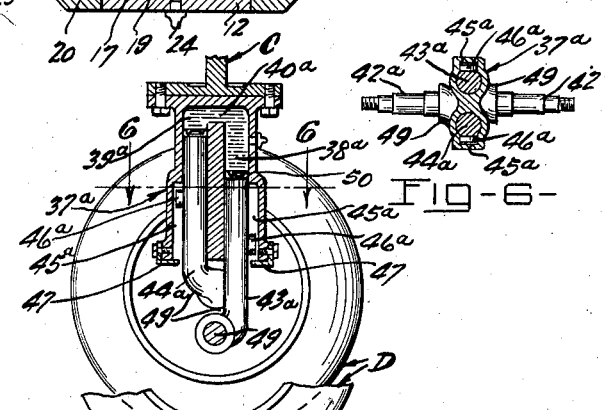
INVENTOR
ADOLPH RONNING
BY
ATTORNEYS Patented Feb. 25, 1941

2,232,972

UNITED STATES PATENT OFFICE 2,232,972

VEHICLE SUPPORTING TRUCK

Adolph Ronning, Minneapolis, Minn.

Application December 28, 1939, Serial No. 311,330

7 Claims. (Cl. 280—87)

This invention relates to vehicle supporting trucks or devices particularly for use with vehicles of the self-propelled type.

The primary object of the invention is to provide means for mounting a pair of ground wheels, preferably in closely spaced relation, so that the wheels as they travel over irregular surfaces may move relatively up and down in differential manner and in accordance with flow and pressure in connected fluid filled chambers with which said wheels are operatively associated, meanwhile maintaining equal distribution of load stresses to the respective wheels at all times. Another object is to provide a device of this kind well adapted for use as the steerable supporting unit at the front of row crop tractor and to provide mounting means for the wheels by which they may be mounted very closely together to thus facilitate their travel between crop rows.

This invention in its general nature and objects is similar to certain of my copending applications Serial No. 219,369, filed July 15, 1938, Serial No. 242,726, filed November 28, 1938, now Patent No. 2,208,600 of July 23, 1940; and Serial No. 250,345, filed January 11, 1939, now Patent No. 2,209,095 of July 23, 1940. Attention is invited to these applications for comparative purposes.

In the drawing:

Fig. 1 is a side elevation of the lower forward portion of a tractor type of vehicle equipped with my invention, parts thereof being shown in section. In this view the wheels are shown as running over an irregular surface and the near wheel is partially broken away.

Fig. 2 is a vertical transverse section along the line 2—2 in Fig. 1.

Fig. 3 is an enlarged section substantially along the line 3—3 in Fig. 1, the wheels being omitted.

Fig. 4 is a view similar to Fig. 2, but showing a modified form of mounting means.

Fig. 5 is a fragmentary longitudinal and vertical sectional view similar to Fig. 1 but showing still another modification.

Fig. 6 is a section along the line 6—6 in Fig. 5, the wheels being again omitted.

Referring more particularly and by reference characters to the drawing, A represents the frame of a conventional tractor, as the forwardly mounted supporting and steering unit of which my invention is shown, although it is to be understood that my device may be used on other vehicles whether as a steering unit or strictly as a supporting unit. The frame A has a forwardly located bearing B in which is journaled a steering post C movable about a generally vertical axis for steering by suitable and conventional steering mechanism (not shown) connected thereto. The rear of the tractor is supported by the usual transversely spaced traction wheels (not shown) which also impart the necessary lateral stability and the front ground wheels D are thus closely spaced since they are not required to give lateral stability and so that they may travel between crop rows.

In the embodiment of my invention shown in Figs. 1 through 3, the steering post C is provided, beneath the bearing B, with a flange 7 braced upwardly against a thrust bearing 8, and adapted to be secured to said flange, by bolts 9, is the flanged upper end 10 of a supporting or mounting member 11, which accordingly may be turned about the upright steering axis to steer the wheels D.

The mounting member 11 has a bearing or journal 12 forwardly and downwardly located from its upper end, and the wheels D are rotatably secured upon spindles 13 extending outwardly from the rear ends of crank members or arms 14 and 15 which carry stub shafts 16 and 17 at their forward ends journaled on transverse axes in the bearing 12. The wheels thus support the crank arms 14 and 15 and they may move relatively up and down at opposite sides of the member about the axes of the shafts 16 and 17. The spindles 13 slope outwardly in order to give the desired camber to the wheels D as shown in Fig. 2, and it will be apparent that the aforesaid up and down movements of the wheels on the crank arms will neither disturb this camber nor cause any transverse frictional contact of the wheels with the ground such as might interfere with steering operations.

The stub shaft 16 is tubular to telescopically receive the smaller, and also tubular, shaft 17 with an interposed oil impregnated bronze bearing or bushing 18, and the shafts are telescopically assembled through opposite ends of the bearing 12 so that the outer shaft 16 turns freely within another bearing or bushing 19 in said bearing. A bolt 20 is then inserted through the bore of the smaller shaft 17 with its head 21 and large lock nut 22 bearing on outer faces of the crank arms 14 and 15. The parts are thus held in assembled relation with the crank arm free to oscillate independently about a common axis. The outer faces of the crank arms are recessed as shown at 23 to receive and protect the bolt head 21 and nut 22 and an oiling fitting 24 is provided for lubricating the assembly at any time. The telescopic assembly of the stub shafts acts to bring the crank arms 14 and 15 together and permit the wheels D to be closely spaced as is clearly evident.

Chambers or cylinders 25 and 26 are formed in, or otherwise arranged rigidly with respect to, the mounting member 11 above the axes of the wheels D and these cylinders are disposed in a generally upright plane and in transversely spaced relation. The upper ends of the cylinders 25 and 26 are connected by a duct 27 and plungers or pistons 28 and 29 are slidably mounted in said cylinders. Links 30 and 31 are pivotally connected at 32 to the lower ends of the plungers 28 and 29 below the cylinders and depending therefrom are pivotally connected on studs or pins 33 extended from inner faces of the crank members 14 and 15 rearwardly of the bearing 12. Cap screws 34 screwed into the inner ends of the studs 33 retain the links in connection with said studs as shown in Fig. 3 and bearing bushings 35 may be employed if desired.

The cylinders 25 and 26 and duct 27 are filled with fluid above the plungers 28 and 29 through an opening sealed by a removable plug 36. In operation then as the vehicle moves over a regular or smooth surface the load stresses are distributed through the journals 16 and 17, and crank arms 14 and 15 to the wheels D, and these parts, as well as the plungers 28 and 29 and links 30 and 31, remain relatively stationary. However, as the wheels meet irregular ground surfaces, as shown in Figs. 1 and 2, either wheel may move upwardly while the other moves downwardly an equal amount to thereby maintain equal supporting contact with the ground and equal load distribution between the wheels. This differential or compensating movement of the wheels of course results from the displacement of the fluid through the duct 27 from the cylinder in which the plunger is moving upwardly to the cylinder in which the plunger is moving downwardly. The hydraulic or fluid actuated differential mechanism is advantageous, in addition to its simplicity and effectiveness, from the fact that it will act to absorb the shocks and jars resulting from the movements of the wheels. The entire supporting unit may of course be steered about the upright axis of the steering post C.

In Fig. 4 a modified structure is shown wherein the crank arms are dispensed with and the wheels D are connected directly to the hydraulic or fluid actuated compensating and differential mechanism. The mounting member 37 is secured by the same flanged and bolted assembly to the steering post C as that heretofore described but has no bearing or journal and the cylinders 38 and 39 open out through lower ends of the member. The said cylinders are connected by a duct 40 and are filled with fluid as described through the opening closed by plug 41. The cylinders are in this case spaced apart transversely to the line of travel of the wheels D and are of course extended in a generally upright plane.

The wheels D are rotatably secured at the lower outwardly turned ends 42 of the plungers 43 and 44 which are slidably mounted upwardly into the cylinders and are of sufficient length to permit the wheels to move upwardly and downwardly in their compensating action during travel over irregular surfaces. Here again the motion is differential due to the displacement of fluid from one cylinder to the other and it is evident that the load distribution to the wheels will remain constant at all times. The wheels D may be brought into even closer spacing by this structure as clearly shown and the lower ends of the plungers 43 and 44 may be sloped to provide the necessary camber for the wheels.

In this structure some means is required to maintain the wheels in alignment with their path of travel and for this purpose the lower outer sides of the cylinders 38 and 39 are provided with longitudinally extended grooves 45 into which slidably extend the cap-screws forming fingers or lugs 46 on the plungers 43 and 44 to thus permit the necessary up and down movement of said plungers while preventing any axial turning movement thereof. Stop members 47 are also secured by screws 48 to the lower ends of the member 37 to engage the lugs 46 and thus prevent the plungers and wheels from dropping clear should the vehicle be raised for any reason.

The modification shown in Figs. 5 and 6 is similar in construction and operation to that just described but the cylinders 38$^a$ and 39$^a$ formed in the mounting member 37$^a$, instead of being transversely spaced, are longitudinally spaced in the direction of travel of the wheels D and are connected by the duct 40$^a$. The plungers 43$^a$ and 44$^a$ therefore are oppositely offset at their lower spindle ends 42$^a$, as shown at 49, to dispose the axes of the wheels D in transverse alignment. Here again the cylinders are provided with grooves 45$^a$ to receive the lugs 46$^a$ on the plungers and hold the wheels in alignment, and stop members 47 are also provided for the purpose aforesaid. Both of the structures shown in Figs. 4 and 5 are of course steerable by the steering post C to which they are connected.

Throughout the various structures described the plungers are shown as fitted on their upper ends with cup washers 50 to prevent the escape of fluid from the cylinders.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A steerable vehicle supporting device comprising a mounting member arranged for oscillation about a generally vertical axis for steering purposes, a pair of crank arms pivotally connected to a lower portion of the mounting member for up and down movements in generally longitudinal planes, ground wheels rotatably secured to the crank arms, the said mounting member having a pair of upright cylinders communicating with each other at their upper ends, the said cylinders being filled with fluid and opening at their lower ends, plungers slidably mounted through said lower ends of the cylinders and upwardly against the fluid therein, and links pivotally connected to the lower ends of the plungers and to the crank arms at points adjacent the ground wheel axes.

2. A steerable vehicle supporting truck comprising a mounting member supported for steering movements about a generally upright axis and having a transverse bearing in a lower portion, crank arms journaled in the said bearing and extending rearwardly therefrom for relative up and down movements, ground wheels rotatably secured to rear portions of the crank arms, the said mounting member having transversely spaced fluid filled cylinders extending in a generally upright plane and opening downwardly above the said crank arms, the said cylinders communicating with each other at upper ends for the transfer of fluid from one to the other, plungers slidably mounted upwardly through the lower ends of the cylinders against the fluid therein, and links pivotally connected to the plungers and to the crank arms at points rearwardly of the said bearing in the mounting member.

3. A steerable vehicle truck comprising a member mounted for oscillating movements about a generally upright axis for steering purposes and having a pair of spaced cylinders opening downwardly, the said cylinders being partially filled with a hydraulic fluid and communicating at their upper ends, a pair of plunger members slidably mounted through the lower ends of the cylinders and having laterally turned wheel mounting lower ends, and ground wheels rotatably secured to the lower ends of the plunger members.

4. A steerable vehicle truck comprising a member mounted for oscillating movements about a generally upright axis for steering purposes and having a pair of cylinders opening downwardly, the said cylinders being partially filled with a hydraulic fluid and communicating at their upper ends, the said cylinders having grooves in their lower portions extending longitudinally with respect to the axis of the cylinders, a pair of wheel supported plungers slidably mounted in the cylinders for differential up and down movements therein, and means on the plungers slidably engaging the said grooves to restrain the plungers against rotary movements in the cylinders.

5. A vehicle supporting device comprising a member having a pair of longitudinally spaced cylinders extended in a generally upright direction therein and opening downwardly, the said cylinders communicating with each other at upper ends and being partially filled with fluid, a pair of wheel supported pistons slidably mounted upwardly into the cylinders for differential up and down movements, and the said pistons being formed at their respective lower ends with rigid angular extensions serving as spindles for the wheels and operating to retain the wheels in a common transverse plane.

6. A vehicle supporting device comprising a member having a pair of longitudinally spaced cylinders, the said cylinders communicating with each other at upper ends and being partially filled with fluid, the said cylinders having grooves in their lower portions extending in parallelism with their axes, a pair of plungers slidably mounted upwardly through the lower ends of the cylinders for differential up and down movements, lugs on the plungers slidably engaging the said grooves to prevent rotary movement of the plungers in the cylinders, and ground wheels mounted directly upon rigid portions of the plungers.

7. A steerable vehicle supporting truck comprising a member mounted for steering oscillation about a generally vertical axis and having a pair of longitudinally spaced downwardly opening cylinders, the said cylinders communicating with each other at upper ends and being partially filled with fluid, a pair of plungers slidably mounted upwardly through the lower ends of the cylinders for differential up and down movements against the fluid in the cylinders, ground wheels rotatably secured to lower ends of the plungers, and the said lower ends of the plungers being offset respectively forwardly and rearwardly to thereby position the wheels in substantially the same transverse plane.

ADOLPH RONNING.